United States Patent [19]

Jünger et al.

[11] 4,192,760

[45] Mar. 11, 1980

[54] COOLING AGENT MIXTURE CONTAINING ETHYLENE GLYCOL MONOACETATE, ETHYLENE GLYCOL DIACETATE, AND GLYCOL MONOMETHYL ETHER FOR LOW-TEMPERATURE FREEZING PROCESSES

[75] Inventors: Rudolf Jünger, Kreuzau; Hans-Joachim Maulhardt, Duren, both of Fed. Rep. of Germany

[73] Assignee: Akzona Incorporated, Asheville, N.C.

[21] Appl. No.: 914,480

[22] Filed: Jun. 12, 1978

[30] Foreign Application Priority Data

Jul. 23, 1977 [DE] Fed. Rep. of Germany ....... 2733313

[51] Int. Cl.² .............................................. C09K 5/00
[52] U.S. Cl. ........................................................ 252/79
[58] Field of Search .................................... 252/79, 76

[56] References Cited

U.S. PATENT DOCUMENTS

| | | | |
|---|---|---|---|
| 1,952,105 | 3/1934 | Tseng | 252/73 |
| 2,160,095 | 5/1939 | Smith | 252/79 |
| 3,003,968 | 10/1961 | Bruce et al. | 252/79 |

*Primary Examiner*—Harris A. Pitlick
*Attorney, Agent, or Firm*—Francis W. Young; Robert F. Green

[57] ABSTRACT

A cooling agent mixture useful in low-temperature freezing processes is disclosed. The mixture comprises, based upon the total weight of the mixture, from about 15 to about 35% ethylene glycol monoacetate and ethylene glycol diacetate, the ratio of the monoacetate to the diacetate being from about 1:9 to about 9:1; and from about 35 to about 65% glycol monomethyl ether. The mixture may also comprise from about 0 to about 18% monovalent, short-chained alcohol, or mixture thereof, from about 0 to about 3% of a corrosion inhibitor, and from about 0 to about 40% water. The compositions have outstanding cooling characteristics and possess viscosities acceptable for use in typical cooling installations.

4 Claims, No Drawings

COOLING AGENT MIXTURE CONTAINING ETHYLENE GLYCOL MONOACETATE, ETHYLENE GLYCOL DIACETATE, AND GLYCOL MONOMETHYL ETHER FOR LOW-TEMPERATURE FREEZING PROCESSES

BACKGROUND OF THE INVENTION

This invention relates to cooling agent mixtures for use in low-temperature freezing processes. This invention also relates to low-cooling agent mixtures which do not corrode stainless steel and aluminum.

The freezing of ice cream, the low-temperature freezing of packaged food, the maufacture of packaged fish fillets, which must be exposed quickly to low temperatures, as well as the low-temperature freezing of coffee and tea for subsequent freeze drying, are performed in different types of freezing equipment. Such equipment is based upon the principle of indirect cooling by circulating cooling agents, such as aqueous salt solutions, which in turn are cooled by an evaporating freezing mixture, such as ammonia or carbon fluoride. The cooling agent transmits the coldness to the material to be frozen.

In the case of immersion freezing, the packaged material to be frozen, which is present in cooling molds or metal pans, is conducted through a brine bath with the aid of transport equipment. The contact freezing process is carried out in periodically operated plate-freezing units. Within the plates consisting of aluminum or stainless steel there are ducts in which the brine is circulated. In continuously operated belt-freezing installations, heat is removed from the belt by spraying with brine.

Aqueous salt solutions of calcium chloride are the most frequently utilized as suitable cooling agents for temperatures down to about −45° C. However, such solutions have a corroding effect on aluminum and stainless steel, and are moreover afflicted with the disadvantage that their viscosity increases at lower temperatures. Because of their more favorable behavior with respect to iron and non-ferrous metals, use is also made of ethylene glycol-water mixtures, but their use is limited by an increasing viscosity in higher concentrations.

In view of the foregoing disadvantages, in particular the corrosion problems, it has become necessary to find a cooling agent which does not possess corroding effects and which, with respect to cooling characteristics, would at least be equal to the known solutions which are based on chlorides, and, furthermore, would meet the requirement for an acceptable viscosity, flash point, and odor.

SUMMARY OF THE INVENTION

Surprisingly, it has now been found that a combination of from about 15 to about 35%, by weight, ethylene glycol monoacetate and ethylene glycol diacetate, wherein the ratio of the monoacetate to the diacetate is from about 1:9 to about 9:1, and from about 35% to about 65%, by weight, of glycol monomethyl ether, has not only outstanding cooling characteristics, but also, with respect to pumpability, possesses a viscosity acceptable for use in cooling installations. The latter characteristic makes it possible to do without the addition of alcohols, if the mixture is to be utilized in installations exposed to danger of fire, for example, for use on shipboard.

DETAILED DESCRIPTION OF THE INVENTION

As indicated, the cooling agent mixture in accordance with the present invention comprises a combination of ethylene glycol monoacetate, ethylene glycol diacetate and glycol monomethyl ether. In addition to the foregoing, if necessary, the cooling agent mixture may also comprise a monovalent, short-chained alcohol, or mixture thereof, such as methanol and/or ethanol. Furthermore, the cooling agent mixture may also comprise water, to increase the flash point.

A corrosion inhibitor may also be utilized in the cooling agent mixture of the present invention. The addition of a corrosion inhibiting agent may be appropriate if pipelines and individual elements of the devices in a cooling installation consist of different metals, so that there exists a danger of the formation of galvanic corrosion elements at the points of contact of the two different metals. Any of the known, customary corrosion inhibitors may be used, for example, sodium nitrate, sodium benzoate, sodium mercaptobenzothiazole, and the like.

The glycol esters and glycol ether utilized in the present invention are known. Heretofore, they have been used as solvents, however, because of their high viscosity, they cannot be used as cooling agents by themselves. The alcohol component which may be optionally present in the compositions of the present invention may also not be used by itself as a cooling agent, because of its low flash point, and because of its odor characteristics.

Preferably, the ratio of the ethylene glycol monoacetate to the ethylene glycol diacetate is from about 4:6 to about 6:4. Especially advantageous cooling properties are obtained when the glycol esters are present in a ratio of 1:1.

The requirements for acceptable cooling agents with respect to their cooling properties and freezing points are adequately met by the compositions of the present invention comprising the glycol esters and glycol ether. However, in order to lower the viscosity, as indicated, monovalent, short-chained alcohols, such as ethanol, methanol, and mixtures thereof, in amounts of from about 0 to about 18%, by weight, may be added to the mixture, if required. Furthermore, from about 0 to about 3%, by weight, of corrosion inhibitors may be incorporated into the mixture, and to lower the flash point, from about 0 to about 40%, by weight, preferably from about 0 to about 35%, by weight, of water may also be added to the mixture.

The present invention is further described in the following non-limiting examples, in which all parts are by weight, unless otherwise indicted:

EXAMPLE 1

A composition comprising the following components was made by simply physically mixing the components:
17.25 parts ethylene glycol monoacetate
17.25 parts ethylene glycol diacetate
62.5 parts glycol monomethyl ether
3.0 parts sodium nitrite, inhibitor
The foregoing composition was determined to have a flash point of +51° C., a freezing point of −90° C., and a viscosity at −50° C. of 45 centipoise.

EXAMPLE 2

The following composition was made by physically blending the components specified:
14 parts ethylene glycol monoacetate
14 parts ethylene glycol diacetate
50 parts glycol monomethyl ether
2 parts sodium nitrite, inhibitor
20 parts water The foregoing composition was determined to have a flash point of +63° C., a freezing point of −58° C., and a viscosity at −50° C. of 180 centipoise.

EXAMPLE 3

The following composition was made by physically blending the components specified:
10 parts ethylene glycol monoacetate
10 parts ethylene glycol diacetate
38 parts glycol monomethyl ether
7 parts ethanol
2.5 parts sodium nitrite, inhibitor
16.5 parts water

EXAMPLE 4

The composition of Example 3 was made into an aqueous dilution contining 80%, by volume, of the mixture of Example 3, and the remainder additional water.

COMPARATIVE EXAMPLE

A solution was made of 427 grams of calcium chloride per liter of water, to simulate a typical aqueous salt solution utilized as a cooling agent.

The physical properties of the compositions prepared in Examples 3 and 4 and in the Comparative Example were determined as follows:

The viscosity was determined at −50° C. with a rotating viscometer made by Haake.

The flash point was determined according to the open flash point test procedure DRB Cleveland.

The results of the comparison are summarized in the following Table.

TABLE

|  | Example 3 undiluted cooling agent | Example 4 80% by vol. cooling agent accdg. to Example 1 | CaCl$_2$ sol 32.3 Be |
|---|---|---|---|
| Freezing point | −100° C. | −63° C. | −53° C. |
| Viscosity at −50° C. | 78 cP | 121 cP | 123 cP |
| Specific heat at −50° C. | 0.590 kcal/kg° C. | 0.726 kcal/kg° C. | 0.63 kcal/kg° C. |
| Flash point | +40° C. | +40° C. | none |
| Odor | alcoholic | faintly alcoholic | none |
| Corrosion vs. stainless steel and aluninum | not corroding | not corroding | strongly corroding pitting |

From the foregoin Table, it is obvious that the compositions of Examples 3 and 4 are suitable for use as cooling agent mixtures, but do not possess the undesirable corrosion characteristics of the calcium chloride solution.

What is claimed is:

1. A cooling agent mixture consisting essentially of, based on the total weight of the mixture,
   (a) from about 15 to about 35 percent ethylene glycol monoacetate and ethylene glycol diacetate, the ratio of the monoacetate to the diacetate being from about 1:9 to about 9:1,
   (b) from about 35 to about 65 percent glycol monomethyl ether,
   (c) from about 0 to about 17 percent monovalent, short-chained alcohols,
   (d) from about 0 to about 3 percent of a corrosion inhibitor, and
   (e) from about 0 to about 40 percent water.

2. The mixture of claim 1 wherein the alcohols are selected from the group consisting of methanol, ethanol, and mixtures thereof.

3. The mixture of claim 1, or 2, wherein the ratio of monoacetate to diacetate is from about 4:6 to about 6:4.

4. The mixture of claim 1, or 2, wherein the ratio of monoacetate to diacetate is about 1:1.

* * * * *